United States Patent [19]

Rottenkolber

[11] 4,281,941

[45] Aug. 4, 1981

[54] DEVICE FOR HIGH THERMAL STRESS CONNECTION BETWEEN A PART MADE OF A CERAMIC MATERIAL AND A PART MADE OF A METALLIC MATERIAL

[75] Inventor: Paul Rottenkolber, Wolfsburg, Fed. Rep. of Germany

[73] Assignee: Volkswagenwerk Aktiengesellschaft, Wolfsburg, Fed. Rep. of Germany

[21] Appl. No.: 85,271

[22] Filed: Oct. 16, 1979

[30] Foreign Application Priority Data

Oct. 20, 1978 [DE] Fed. Rep. of Germany ....... 2845716

[51] Int. Cl.³ .................. F16C 9/00; F16D 1/00; F16G 11/00
[52] U.S. Cl. .................................. 403/29; 403/30; 403/179; 403/404; 29/156.8 R; 228/122
[58] Field of Search ................. 403/179, 404, 28, 29, 403/30; 29/156.8 R, 156.8 B; 228/122, 124, 188

[56] References Cited

U.S. PATENT DOCUMENTS

| 2,075,477 | 3/1937 | Smith | 228/124 |
| 2,767,339 | 10/1956 | Hatfield | 403/404 X |
| 3,751,577 | 8/1973 | Rich | 403/179 X |
| 3,823,772 | 7/1974 | Lavering et al. | 403/179 X |
| 4,098,476 | 7/1978 | Jutte et al. | 403/30 X |

*Primary Examiner*—Wayne L. Shedd
*Attorney, Agent, or Firm*—Brumbaugh, Graves, Donohue & Raymond

[57] ABSTRACT

An improvement in a high thermal stress connection between a rotationally symmetrical component made of ceramic material and a component made of metallic material is provided in which a connecting part which is elastic and radially and axially resilient connects the ceramic part and the metallic part by means of high temperature soldering. The stresses normally produced by differential expansion of the ceramic part and the metallic part are substantially absorbed by elastic deformation of the connecting part.

14 Claims, 6 Drawing Figures

DEVICE FOR HIGH THERMAL STRESS CONNECTION BETWEEN A PART MADE OF A CERAMIC MATERIAL AND A PART MADE OF A METALLIC MATERIAL

BACKGROUND OF THE INVENTION

This invention relates to providing a turbine engine with rotors or turbine discs which are made of ceramic materials such as silicon nitride or silicon carbide. In particular, the invention relates to the high thermal stress connection between the metallic shaft of a turbine engine and a ceramic turbine rotor having a shortened or stub shaft.

It is known that to provide a turbine engine, such as a gas turbine or a turbocharger, with ceramic rotors or turbine discs offers substantial advantages in the form of increased temperature stability and reduced moment of inertia. In terms of building the mechanisms and integrating the assemblies of the overall engine, however, it is better to make the turbine shaft out of metallic materials. Connecting the ceramic turbine discs (or rotors) to metallic shafts has become quite a costly and problematic task due, primarily, to the brittleness of the ceramic materials and the markedly different coefficients of thermal expansion of metallic material and ceramic material.

There are presently known arrangements in which the turbine discs are connected to the shaft by means of tension bolts through a central bore of the disc. The face of the disc in contact with the shaft is then generally executed in the form of a Hirth serration. The surfaces of contact between ceramic and metal call for heavy manufacturing outlay, since point loads must be avoided. The bolt needs to be elaborately designed to equalize differential heat expansion of disc and shaft. Besides, in the known types of connection, the critically stressed disc needs to be provided with a bore. But such discs provided with through holes incur service stresses about twice as high as those in unbored discs. It has likewise been proposed in United States patent Application Ser. No. 40,121, dated May 18, 1979, that a base portion belonging to a ceramic turbine blade be soldered directly to a metal shaft part enclosing the stub. Owing to the great differences in thermal expansion between the parts to be connected, high shrinkage stresses arise at the soldered joints during cooling after the soldering operation. These shrinkage stresses give rise to high compressions in the ceramic base, which in principle the ceramic material is well able to withstand. At the transition from the soldered joint to the exposed blade, however, stress concentrations occur, with high tensions that the ceramic material will not tolerate. Under service conditions with cyclic temperature stress, these compressions can be cut down by plastic deformation. But upon further thermal stress, high tensions will be generated at the junction, and may lead to failure of the soldered joint or of the ceramic base.

It is therefore an object of the present invention to provide a connection between a metallic shaft and a ceramic disc which eliminates the problems caused by the great differential in the coefficients of thermal expansion between ceramic material and metallic material.

It is a further object of the invention to provide a means for connecting a metallic shaft to a ceramic disc wherein the problems of a temperature stressed ceramic disc normally associated with a soldered connection between such components is eliminated.

SUMMARY OF THE INVENTION

In accordance with the present invention there is provided an improvement in the high thermal stress connection between a rotationally symmetrical component of a ceramic rotor or disc and a metallic shaft whereby a connecting part is provided which is elastic and radially and axially resilient. Stresses produced by differential expansion of the ceramic part and the metallic part during high temperature soldering are absorbed by elastic deformation of the connecting part.

According to one embodiment of the invention the connecting part is a sleeved-shape part made of metal which fits over the ceramic component and may be a part of the metallic shaft itself. The connecting part is soldered to the ceramic component but should not be attached over the entire axial surface of the ceramic component and preferably attached to not more than 20% of the outer surface of the ceramic component.

In a preferred embodiment of the invention there is provided a connecting part composed of a spring member inserted between the ceramic component and a sleeve-shaped part. The spring member can be a corrugated thin wall tube or elements that are spiraled around the ceramic component or elements that form at least one closed ring around the ceramic component. Such spiraled or ring spring elements may have cross sections in the form of an "S", or tubular in shape and are characterized by having axially directed conduits. In this same embodiment the spring member may also be in the form of a substantially axial, tongue-shaped tab.

Such an improvement in the connection between the ceramic component and the metallic component ensures that even under the extreme temperature stresses occurring during the soldering operation, no unacceptable stresses will arise, especially in the ceramic part, that might result in its destruction.

For a better understanding of the present invention, together with other and further objects reference is made to the following description, taken in conjunction with the accompanying drawings, and its scope will be pointed out in the appended claims.

DESCRIPTION OF THE PREFERRED EMBODIMENT

Figure 1:
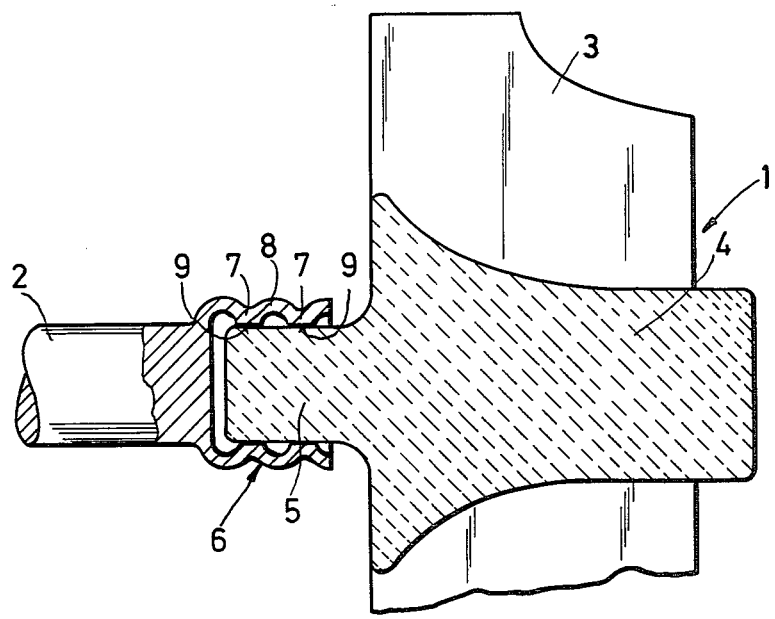
FIG. 1 is a longitudinal section of a connection between a metal shaft and a ceramic turbine rotor in accordance with the invention in which the connecting part consists of a sleeve-like part made in one piece with the metal shaft.

Referring to FIG. 1 there is shown a turbine rotor 1 made of a ceramic material, for example silicon nitride or silicon carbide, and a metal turbine shaft 2. The turbine rotor 1 shown in this figure, which is of the kind intended for an exhaust turbocharger, has radial type blades 3 with a hub 4 and a short shaft component or stub 5 provided on its face, all of which are made in one piece of ceramic material by known methods of manufacture. One such method is by pressure casting or slick casting, followed by firing and sintering with or without nitrogenation as the case may be.

There is a metal shaft 2 which has a sleeve portion 6 that slips over the ceramic stub 5. The sleeve portion 6 may be made in one piece with the metal shaft 2 or connected to it by known methods such as welding or the like. This sleeve part 6 has a substantially corrugated contour with radially inner and outer portions 7 and 8 respectively, of which the radially inner portions 7 are connected to the ceramic stub shaft 5 by soldering at points 9. The relatively thin-walled corrugated sections of the sleeve result in an elasticity sufficient to absorb by elastic deformation the stresses due to differential expansion of the parts during soldering, between the metallic and the ceramic part. As a result no injurious tensile stresses can be transmitted to the ceramic part either during soldering or during turbine operation.

The embodiments of FIGS. 2 to 6, which show the point of connection to a larger scale, differ from the embodiment of FIG. 1 in that, instead of a connecting part connected to the turbine shaft beforehand, separate spring members to be connected both to the metallic shaft part and to the ceramic stub shaft by soldering are provided, to absorb the stresses caused by differential expansion during soldering.

Figure 2:
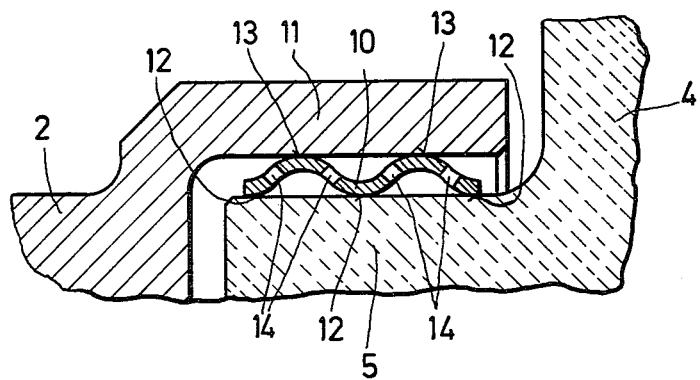
FIGS. 2 to 6 show a longitudinal section of the improved connection in accordance with another design of the invention wherein various embodiments of separate spring members soldered in between the ceramic stub shaft and a rigid sleeve part connected to the metal shaft.

Thus FIG. 2 shows a spring member in the form of a corrugated thin-walled tube 10, its radially inner contour connected at soldered joints 12 to the ceramic stub shaft 5 and its radially outer contours connected by soldered joints 13 to the inner surface of a rigid sleeve 11 in one piece with the metal shaft 2. In the midportion of the corrugated contour, conduits 14 are provided, to serve as vents for the gases generated in soldering.

Figure 3:
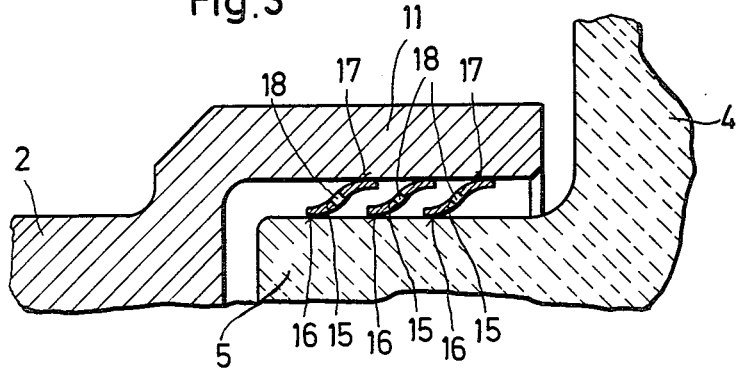
Figure 4:
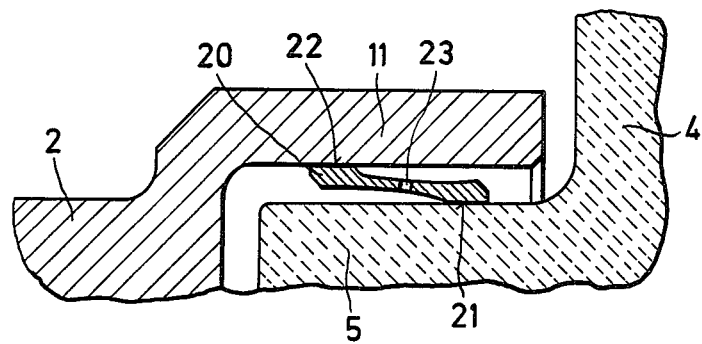

In FIGS. 3 and 4, the spring members are of S-shaped cross section, the embodiment of FIG. 3 comprising either a plurality of rings or one coiled spring 15 of S-shaped cross section. In either case, the radially outer flanges of the S-shaped cross section are fixed to the inner surface of the sleeve part 11 of the metal shaft 2 by soldering at points 17, and the radially inner flanges are fixed to the stub shaft 5 of the ceramic rotor 4 by soldering at points 16. The midportion of the cross section 15 again shows conduits 18 for pressure equalization and to vent the spaces enclosed between the several cross sections.

In the embodiment shown at FIG. 4, the spring member consists of a single ring 20 of S-shaped cross section, again connected by its radially outer edge to the ceramic component 5 by soldering at point 21 and by its radially outer edge to the metal part 11 by soldering at point 22. Again, conduit 23 is provided in the midportion of the annular cross section.

Figure 5:
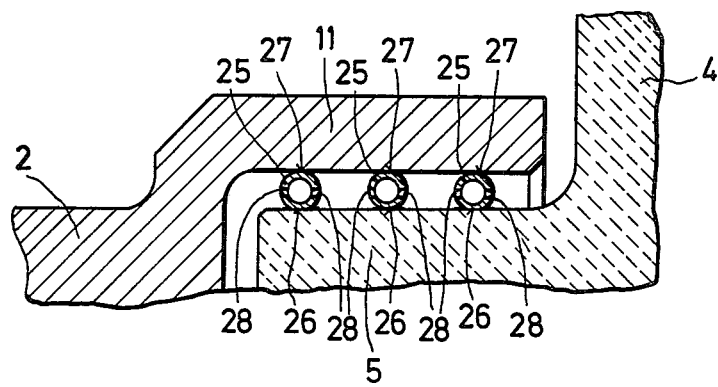

Finally, FIG. 5 shows another embodiment of the invention, in which the spring member or members comprise a tubular section 25 having conduits 28 in its wall and having its radially inner edge hard-soldered at points 26 to the stub shaft 5 of the ceramic rotor 4 and its radially outer edge soldered at points 27 to the sleeve portion 11 of the metal turbine shaft 2. Much as in the embodiment of FIGS. 3 and 4, the spring member may consist of single rings or one spring member coiled around the stub shaft 5, in which latter case there may be advantages in terms of larger manufacturing tolerances on the ceramic or the metal part.

Figure 6:
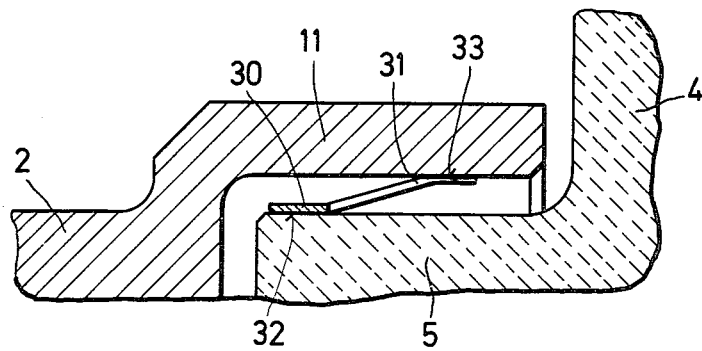

Still another embodiment of the spring members as represented in FIG. 6, where substantially axial tongue-like tabs 31 of a sleeve part 30 soldered at point 32 to the ceramic stub are likewise soldered at point 33 to the metal sleeve 11.

In all cases, the elasticity of the spring members should be such that the stresses arising from differential expansion of the parts during extreme temperature exposure, during soldering for example, will be substantially absorbed by elastic deformation of the spring members, and no undue tensile stresses especially will be exerted on the ceramic part. Another advantage of the device according to the embodiment of the invention is that the ceramic stub shaft 5 of the turbine rotor requires no precision machining, since any tolerances may, to a large extent, be taken up by the solder and by a suitable adjustment of the spring members. If the ceramic part is somewhat out of round, the spring member or members may first be attached to it by soldering, and then machined on the outside diameter. The spring members, to permit free conformation of the outer contour of the sleeve 11 connected to the shaft 2, for sealing purposes for example, should preferably be connected to the stub shaft over less than 20% of its total length, to minimize shrinkage stresses in the soldered joints.

The connection may alternatively be designed for a tapered stub shaft. This provides a more favorable stress distribution at the transition from the shaft to the hub.

While there have been described what are believed to be the preferred embodiments of the invention, those skilled in the art will realize that changes and modifications may be made thereto without departing from the spirit of the invention, and it is intended to claim all such changes and modifications as fall within the true scope of the invention.

I claim:

1. In a high thermal stress connection between an essentially rotationally symmetrical component made of ceramic material and a component made of metallic material in which the components are connected by means of high temperature soldering, the improvement wherein a connecting part is provided which connects said ceramic component to said metallic component, and which said connecting part is elastic and radially and axially resilient so that stresses produced by differential expansion of said ceramic component and said metallic component during soldering are substantially absorbed by elastic deformation of said connecting part.

2. The apparatus according to claim 1, wherein said connecting part is a sleeve-shaped part which fits over said ceramic component.

3. The apparatus according to claim 1 or 2, wherein said connecting part is made of a metallic material.

4. The apparatus according to claim 1 or 2, wherein said connecting part is soldered to a radially outer surface of said ceramic component, said soldering being on only a portion of said radially outer surface.

5. The apparatus according to claim 4, wherein said portion of said radially outer surface is not more than 20%.

6. The apparatus according to claim 1 or 2, wherein said connecting part comprises a portion of said metallic component.

7. The apparatus according to claim 1, wherein said metallic component includes a sleeve-shaped part and said connecting part comprises at least one spring member inserted between said ceramic component and said sleeve-shaped part, said spring member connected to said ceramic part and said sleeve-shaped part by soldering.

8. The apparatus according to claim 7, wherein said spring member comprises a corrugated thin-walled tube.

9. The apparatus according to claim 7, wherein said spring member has an S-shaped cross section in a circumferential direction, and is soldered by its radially outer flange to the interior surface of said sleeve part and by its radially inner flange to a radially outer surface of said ceramic component.

10. The apparatus according to claim 7, wherein said spring member has a tubular cross section in a circumferential direction.

11. The apparatus according to claim 9 or 10, wherein said spring member comprises at least one closed ring.

12. The apparatus according to claim 11, wherein said ring has axially directed conduits.

13. The apparatus according to claim 9 or 10, wherein said spring members are spiraled around said ceramic component.

14. The apparatus according to claim 7, wherein said spring member is in the form of substantially axial, tongue-shaped tab.

* * * * *